United States Patent
Dong et al.

(10) Patent No.: US 11,941,302 B2
(45) Date of Patent: Mar. 26, 2024

(54) METHOD, ELECTRONIC DEVICE AND COMPUTER PROGRAM PRODUCT FOR MANAGING DISKS BASED ON PERFORMANCE INFORMATION OF ACCESS PATTERN

(71) Applicant: Dell Products L.P., Round Rock, TX (US)

(72) Inventors: Hailan Dong, Chengdu (CN); Changyue Dai, Sichuan (CN); Chi Chen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/889,626

(22) Filed: Aug. 17, 2022

(65) Prior Publication Data
US 2023/0236728 A1    Jul. 27, 2023

(30) Foreign Application Priority Data
Jan. 21, 2022  (CN) .......................... 202210073514.4

(51) Int. Cl.
*G06F 3/06* (2006.01)

(52) U.S. Cl.
CPC ............ *G06F 3/0685* (2013.01); *G06F 3/061* (2013.01); *G06F 3/0649* (2013.01)

(58) Field of Classification Search
CPC ......... G06F 3/061; G06F 3/0647–0649; G06F 3/0685
See application file for complete search history.

(56) References Cited

U.S. PATENT DOCUMENTS

| | | | |
|---|---|---|---|
| 6,032,224 A | 2/2000 | Blumenau | |
| 8,205,054 B2 | 6/2012 | Usami | |
| 10,353,616 B1* | 7/2019 | Tao | ........................ G06F 3/061 |
| 11,402,998 B2 | 8/2022 | Dalmatov | |
| 11,435,932 B1 | 9/2022 | Chen et al. | |
| 11,461,250 B2 | 10/2022 | Dalmatov | |
| 11,461,287 B2 | 10/2022 | Dalmatov | |

* cited by examiner

*Primary Examiner* — Chie Yew
(74) *Attorney, Agent, or Firm* — BainwoodHuang

(57) ABSTRACT

Techniques for managing disks involve determining performance information of an access pattern of a disk slice based on differences in performance parameters of the access pattern of the disk slice on a plurality of disks. Such techniques further involve determining a score for the disk slice based on the performance information and access frequency information of the disk slice. Such techniques further involve determining a position of the disk slice in the plurality of disks based on the score.

13 Claims, 5 Drawing Sheets

METHOD, ELECTRONIC DEVICE AND COMPUTER PROGRAM PRODUCT FOR MANAGING DISKS BASED ON PERFORMANCE INFORMATION OF ACCESS PATTERN

CROSS-REFERENCE TO RELATED APPLICATION

This application claims priority to Chinese Patent Application No. CN202210073514.4, on file at the China National Intellectual Property Administration (CNIPA), having a filing date of Jan. 21, 2022, and having "METHOD, ELECTRONIC DEVICE AND COMPUTER PROGRAM PRODUCT FOR MANAGING DISKS" as a title, the contents and teachings of which are herein incorporated by reference in their entirety.

TECHNICAL FIELD

Embodiments of the present disclosure relate to the field of data storage, and more particularly, to a method, an electronic device, and a computer program product for managing disks.

BACKGROUND

Virtual Pool Fully Automated Storage Tiering (FAST VP) technology is used to automatically classify different kinds of data into different types of storage media in a tiering pool. In order to implement FAST VP, for example, frequently accessed or important data may be moved to a fast, high-performance, and correspondingly high-cost disk, and less accessed or less important data may be moved to a slow, low-performance, and correspondingly low-cost disk. FAST VP can reduce the Total Cost of Ownership (TCO) of a product and improve performance. However, the conventional FAST VP technology only considers an activity level of a disk slice, i.e., an access frequency, and thus may result in low efficient data movement.

SUMMARY OF THE INVENTION

Embodiments of the present disclosure provide a method, an electronic device, and a computer program product for managing disks.

According to a first aspect of the present disclosure, a method for managing disks is provided. The method includes determining performance information of an access pattern of a disk slice based on differences in performance parameters of the access pattern of the disk slice on a plurality of disks. In addition, the method further includes determining a score for the disk slice based on the performance information and access frequency information of the disk slice. Further, the method includes determining a position of the disk slice in the plurality of disks based on the score.

According to a second aspect of the present disclosure, an electronic device is provided. The electronic device includes: a processor; and a memory storing computer program instructions, wherein the processor executes the computer program instructions in the memory to control the electronic device to perform actions including: determining performance information of an access pattern of a disk slice based on differences in performance parameters of the access pattern of the disk slice on a plurality of disks; determining a score for the disk slice based on the performance information and access frequency information of the disk slice; and determining a position of the disk slice in the plurality of disks based on the score.

According to a third aspect of the present disclosure, a computer program product is provided, which is tangibly stored on a non-volatile computer-readable medium and includes machine-executable instructions which, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Figure 1:
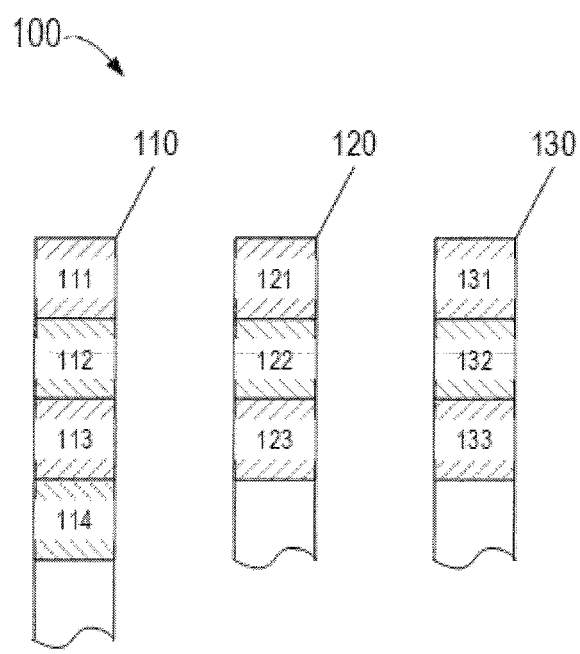
FIG. 1 shows a schematic diagram of an application scenario of managing disks according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

Most data has a long life cycle since it is generated. As data advances through its life cycle, the data's capability characteristics, such as frequency of access, will change. For example, data is usually frequently used when created, i.e., the number of times the disk slice where the data is located is accessed per unit time is high. The number of accesses to the data decreases over time. Virtual Pool Fully Automated Storage Tiering (FAST VP) technology may dynamically match storage requirements with changes in the accessed frequency of data. For example, data that is accessed frequently may be stored in flash drives in an extremely high performance tier. When the accessed frequency of the data is at a common level, the data may be moved to a serial connection SCSI (SAS) drive in a performance tier. When the accessed frequency of the data is lower, the data may be further moved to a near line-SAS (NL-SAS) drive in a capacity tier.

The conventional FAST VP technology still has many limitations. For example, the technology only considers the access frequency of disk slices, and does not consider performance information of each disk slice (that has a particular access pattern) in a particular storage disk. Therefore, there may be a situation that the access frequency of the disk slice is high, but if the disk slice is moved to a higher-tier storage disk, the cost performance ratio as a result of the data movement is low. How to comprehensively consider these parameters to achieve tiered operations of data in individual disk slices in a storage disk is an urgent problem to be solved.

In order to solve the above problem, the present disclosure proposes a scheme for managing disks. In this scheme, comprehensive scores for corresponding disk slices may be calculated by counting specific performance information of disk slices under various access patterns in storage disks at different tiers and access frequency information of corresponding disk slices. In addition, more specifically, when performance information of a disk slice is considered, at least one of performance parameters such as bandwidth, Input/Output Operations Per Second (IOPS), and response time of the disk slice may be comprehensively considered, thereby more objectively evaluating the state of the disk slice. The basic idea of the present disclosure will be discussed below in conjunction with FIG. 1.

FIG. 1 shows a schematic diagram of application scenario 100 of managing disks according to an embodiment of the present disclosure. As shown in FIG. 1, storage disks 110, 120, and 130 are all used to store data. In some embodiments, storage disks 110, 120, and 130 are respectively used to store different types of data. By way of example, storage disks 110, 120, and 130 may be a flash drive (including NVMe Flash and SAS Flash), a serial connection SCSI (SAS) drive, and a near line SAS (NL-SAS) drive, respectively. It should be understood that the flash drive is typically in an extremely high performance layer for storing data that is accessed frequently. The SAS drive is in a performance layer for storing data that is accessed at a common frequency. The NL-SAS drive is in a capacity layer for storing data that is accessed less frequently.

In a storage system, physical storage disks may be organized using various algorithms. For a better understanding of a storage system, FIG. 1 shows application scenario 100 of a storage system. As shown in FIG. 1, a storage disk is divided into a plurality of storage blocks. These storage blocks are also referred to as disk slices. As shown in FIG. 1, storage disk 110 may contain at least disk slices 111, 112, 113, and 114, storage disk 120 may contain at least disk slices 121, 122, and 123, and storage disk 130 may contain at least disk slices 131, 132, and 133. Such division of storage disks may be a logical division. The size of each disk slice depends on the storage disk size and the division manner. In some examples, the size of a disk slice may be at a gigabyte level. Of course, other sizes of disk slices are also possible according to actual deployment needs.

A storage system (not shown) may acquire relevant parameters of a plurality of storage disks managed thereby. By way of example, the storage system may determine at least one of performance parameters such as bandwidth, Input/Output Operations Per Second (IOPS), and response time of each disk slice in various storage disks, and determine performance information of corresponding disk slices based on these performance parameters. Further, the storage system may acquire access frequency information or access count information of each disk slice. By comprehensively considering the performance information and access frequency information of disk slices, FAST VP can be performed more accurately and efficiently, and the storage efficiency can be improved.

Implementations of managing storage disks 110, 120, and 130 and disk slices therein are described above with reference to FIG. 1. The above examples are only for illustrating the present disclosure, rather than limiting the present disclosure. A flow chart of a process for managing disks will be described in detail below in conjunction with FIG. 2.

Figure 2:
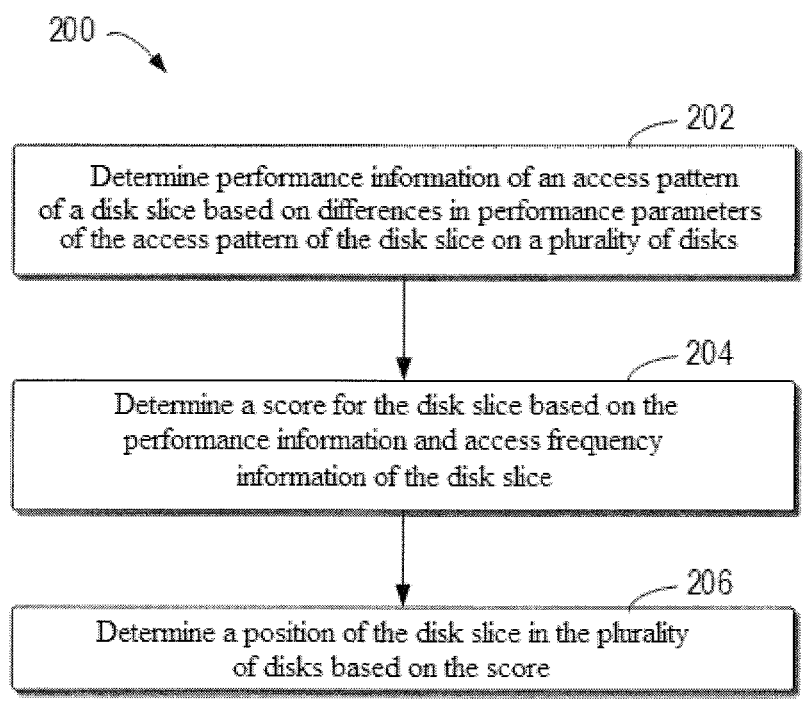
FIG. 2 shows a flow chart of a process for managing disks according to an embodiment of the present disclosure.

FIG. 2 shows a flow chart of process 200 for managing disks according to an embodiment of the present disclosure. In some embodiments, process 200 may be implemented in a device shown in FIG. 5. By way of example, process 200 may be implemented in the form of application scenario 100 of managing storage disks 110, 120, and 130 shown in FIG. 1. Process 200 for managing disks according to an embodiment of the present disclosure is now described with reference to FIG. 1. For ease of understanding, the specific data mentioned in the following description are all illustrative and are not intended to limit the scope of protection of the present disclosure.

At 202, a storage system may determine performance information of an access pattern of a disk slice based on differences in performance parameters of the access pattern of the disk slice on a plurality of storage disks 110, 120, and 130. It should be understood that the number of the plurality of storage disks is not limited to the number shown in FIG. 2, and it may also be other numbers. It should also be understood that a disk slice typically has a particular access pattern (IO pattern). By way of example, a disk slice may have a plurality of access patterns, depending on an access capacity size (IO size), a read-write ratio, a random/sequential ratio, etc. For example, an access pattern of a disk slice may include: 128K_70R_0S, 4K_70R_0S, 8K_0R_100S, 8K_70R_0S, 32K_70R_0S, 8K_90R_100S, and other patterns. It should be understood that the access pattern "128K_70R_0S" indicates that the access capacity size of the access pattern is 128 KB, a percent of read operations in access operations is 70%, and 0% of the access operations are sequential. The meanings of the remaining access patterns may be obtained by analogy and will not be repeated here.

It has been found experimentally that the performance of disk slices of different access patterns on different tiers of storage disks is different and may be predetermined. Therefore, when determining performance information of a disk slice, conventional information of the disk slice may be acquired first, and a specific access pattern of the disk slice may be determined therefrom, i.e., the performance information of the disk slice may be determined.

Figure 3:
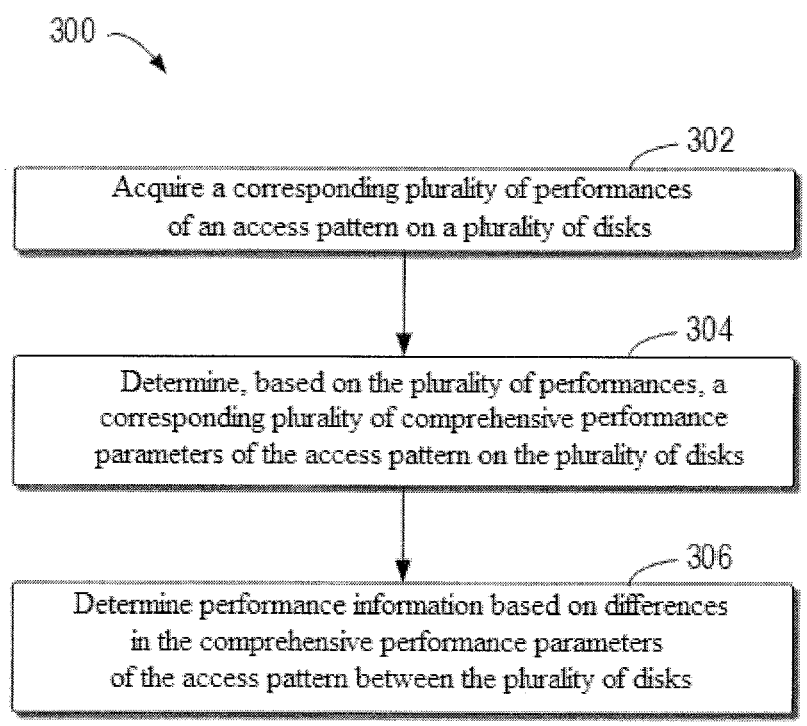
FIG. 3 shows a flow chart of a process for determining performance information according to an embodiment of the present disclosure.

The process for determining performance information of a disk slice will be described in detail below with the description of FIG. 3. FIG. 3 shows a flow chart of process 300 for determining performance information according to an embodiment of the present disclosure. In some embodiments, process 300 may be implemented in a device shown in FIG. 5. By way of example, process 300 may be implemented in the form of application scenario 100 of managing storage disks 110, 120, and 130 shown in FIG. 1. Process 300 for managing disks according to an embodiment of the present disclosure is now described with reference to FIG. 1. For ease of understanding, the specific data mentioned in the following description are all illustrative and are not intended to limit the scope of protection of the present disclosure.

At 302, a storage system may acquire a corresponding plurality of performances of disk slices of different access patterns on a plurality of storage disks 110, 120, and 130, such as at least one of bandwidth, Input/Output Operations Per Second, and response time. By way of example, performance tables of different access patterns corresponding to different storage disks can be determined by acquiring system data, as shown in Table 1 below.

TABLE 1

| Access Pattern | Performance Parameter | Flash | SAS | NL-SAS |
|---|---|---|---|---|
| 128K_70R_0S | Bandwidth (MB/s) | 29 | 10 | 4 |
| | IOPS | 233 | 82 | 38 |
| | Response time (ms) | 2 | 11 | 26 |
| 4K_70R_0S | Bandwidth (MB/s) | 1 | 0.4 | 0.19 |
| | IOPS | 275 | 104 | 47 |
| | Response time (ms) | 1.4 | 8.8 | 18.8 |
| 8K_0R_100S | Bandwidth (MB/s) | 4.5 | 4.4 | 4.4 |
| | IOPS | 582 | 568 | 565 |
| | Response time (ms) | 1.6 | 1.6 | 1.6 |
| 8K_70R_0S | Bandwidth (MB/s) | 4.5 | 3.7 | 3.7 |
| | IOPS | 587 | 474 | 472 |
| | Response time (ms) | 1.2 | 1.7 | 1.7 |
| 32K_70R_0S | Bandwidth (MB/s) | 2.7 | 1.7 | 1 |

TABLE 1-continued

| Access Pattern | Performance Parameter | Flash | SAS | NL-SAS |
|---|---|---|---|---|
| | IOPS | 86 | 53 | 32 |
| | Response time (ms) | 6 | 14 | 27 |
| 8K_90R_100S | Bandwidth (MB/s) | 4.8 | 3.2 | 2.9 |
| | IOPS | 614 | 412 | 372 |
| | Response time (ms) | 1 | 1.8 | 1.9 |

At 304, the storage system may determine, based on the plurality of performances, a corresponding plurality of comprehensive performance parameters of each access pattern on the plurality of disks.

By way of example, it is assumed that $C_{Bj,k}$ is a bandwidth of certain access pattern $P_j$ on certain storage disk k, $C_{Ij,k}$ is IOPS of access pattern $P_j$ on storage disk k, and $C_{Rj,k}$ is a response time of access pattern $P_j$ on certain storage disk k. Since the three performance parameters have different units, it is necessary to first perform the following normalization operation on these performance parameters using the following equations:

$$NC_{Bj,k} = \frac{C_{Bj,k}}{\sum_{k=1}^{K} C_{Bj,k}}, \qquad \text{Equation 1}$$

$$NC_{Ij,k} = \frac{C_{Ij,k}}{\sum_{k=1}^{K} C_{Ij,k}}, \qquad \text{Equation 2}$$

$$NC_{Rj,k} = \frac{1/C_{Rj,k}}{\sum_{k=1}^{K} 1/C_{Rj,k}}. \qquad \text{Equation 3}$$

$NC_{Bj,k}$ is a normalized result of $C_{Bj,k}$, $NC_{Ij,k}$ is a normalized result of $C_{Ij,k}$, and $NC_{Rj,k}$ is a normalized result of $C_{Rj,k}$. Thus, a corresponding plurality of comprehensive performance parameters of each access pattern on the plurality of disks, i.e., comprehensive performance parameter $G_{j,k}$ of access pattern $P_j$ on storage disk k, may be determined using the following equation:

$$G_{j,k} = NC_{Bj,k} + NC_{Ij,k} + NC_{Rj,k} \qquad \text{Equation 4.}$$

In this way, performance information of different dimensions may be integrated into performance information of a unified dimension to facilitate subsequent performance evaluation.

At 306, the storage system may determine performance information based on differences in the comprehensive performance parameters of the access pattern between the plurality of disks. In some embodiments, in order to determine the performance information, the storage system may determine a standard deviation of the comprehensive performance parameters of the access pattern between the plurality of disks.

By way of example, after comprehensive performance parameter $G_{j,k}$ is determined, it may optionally be subjected to a further normalization operation using the following equation to obtain normalized comprehensive performance parameter $NG_{j,k}$:

$$NG_{j,k} = \frac{G_{j,k}}{\sum_{k=1}^{K} G_{j,k}}. \qquad \text{Equation 5}$$

And thus, it is possible to determine average comprehensive performance parameter $NG_{average}$ of access pattern $P_j$ on storage disk k:

$$NG_{average} = \frac{\sum_{k=1}^{K} NG_{j,k}}{K}.$$ Equation 6

After determining normalized comprehensive performance parameters $NG_{j,k}$ and $NG_{average}$ of access pattern $P_j$ on storage disk k, a standard deviation of performances of access pattern $P_j$ on storage disk k may be determined:

$$\sigma_j = \sqrt{\frac{\sum_{k=1}^{K}(NG_{j,k} - NG_{average})^2}{K}}.$$ Equation 7

It should be understood that the manner of determining the performance information is not limited to calculating a standard deviation, and that the performance information may also be determined using variance, mean-square deviation, etc. Alternatively or additionally, as the bandwidth is greater, the value of IOPS is greater, the response time is shorter, and the performance parameter is higher. Therefore, the above performance information may be calculated in a manner that the bandwidth and the IOPS are proportional to the performance parameter, and the response time is inversely proportional to the performance parameter. In the above manner, the performance information of various access patterns on various storage disks may be quantitatively and accurately determined and used to indicate the performance difference of one access pattern on different storage disks.

At 204, the storage system may determine a score for the disk slice based on the performance information determined above and access frequency information of the disk slice. In some embodiments, the storage system may acquire the access pattern of each disk slice in a storage disk through a system query. It should be understood that one disk slice usually corresponds to only one access pattern. Since the storage system may determine performance information of various access patterns on various storage disks according to the above equations, the storage system may further determine performance information of a disk slice currently required to be subjected to FAST VP on various storage disks. Since the storage system may also learn access frequency information or access count information of the disk slice as in the conventional FAST VP technology, a score may be determined based on the performance information and the access frequency information. By way of example, score $D_i$ may be determined based on the product of performance information $\sigma_i$ and access frequency information $C_i$ of corresponding access pattern $P_i$ of particular disk slice Si on each storage disk k with the following equation:

$$D_i = \sigma_i \cdot c_i = \sqrt{\frac{\sum_{k=1}^{K}(NG_{i,k} - NG_{average})^2}{K}} \cdot c_i$$ Equation 8

It should be understood that the determination of score $D_i$ is not limited to the determination of the product of performance information a, and access frequency information $C_i$. In this way, the score combines the performance information and the access frequency information of the disk slice, thereby taking more factors into account.

At 206, the storage system may determine a position of the disk slice in the plurality of disks based on the score. In some embodiments, if it is determined that the score is higher than or equal to a threshold score, the storage system may move the disk slice to a position having a first priority in the plurality of disk stores, and if it is determined that the score is lower than the threshold score, the storage system may move the disk slice to a position having a second priority in the plurality of storage disks. It should be understood that the first priority is higher than the second priority.

Figure 4:
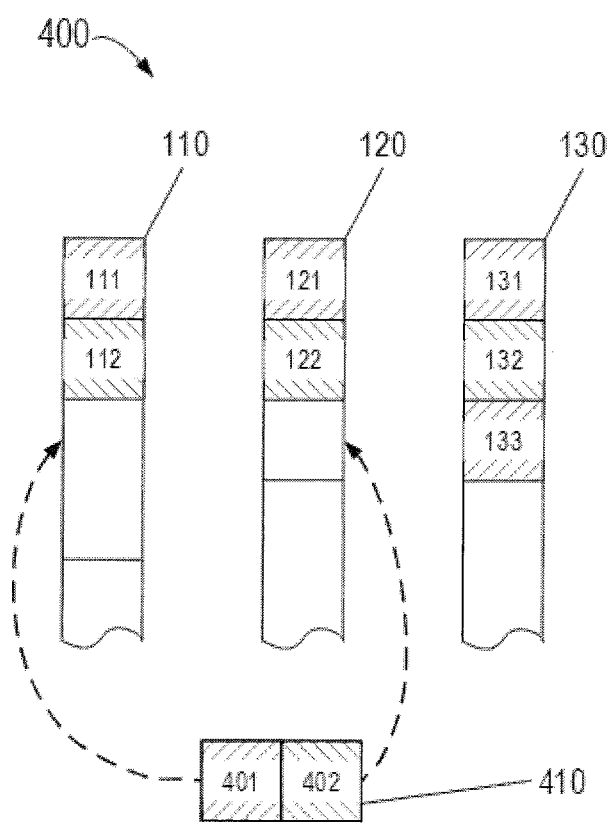
FIG. 4 shows a schematic diagram of an application scenario for managing a disk slice according to an embodiment of the present disclosure.

FIG. 4 shows a schematic diagram of application scenario 400 for managing a disk slice according to an embodiment of the present disclosure. Similar to FIG. 1, storage disks 110, 120, and 130 may be a flash drive (including NVMe Flash and SAS Flash), a serial connection SCSI (SAS) drive, and a near line SAS (NL-SAS) drive, respectively. Moreover, storage disk 110 may contain at least disk slices 111 and 112, storage disk 120 may contain at least disk slices 121 and 122, and storage disk 130 may contain at least disk slices 131, 132, and 133.

As shown in FIG. 4, disk slices 401 and 402 are disk slices that are being evaluated to determine a tier to which they belong. It should be understood that disk slices 401 and 402 may originally belong to one of storage disks 110, 120, and 130, or may be new disk slices into which data is written. The storage system may respectively determine respective scores for disk slices 401 and 402 and rank them to form ranked disk slice group 410. In disk slice group 410, since the score for disk slice 401 is higher than the score for disk slice 402, disk slice 401 may be allocated to storage disk 110 at a high tier, and disk slice 402 may be allocated to storage disk 120 at a low tier. It should be understood that only two disk slices to be allocated are involved in FIG. 4 for clarity of illustration, which is not intended to limit the present disclosure, there may be a plurality of disk slices to be allocated, and several disk slices may be allocated to storage disks at the same tier based on the score.

By implementing the above multiple embodiments, it is possible to determine the score of each disk slice based on more and more comprehensive information. Based on this score, the storage disk to which each disk slice belongs may be further determined, i.e., it may be ensured that each storage disk can be used uniformly and reasonably. Thus, for disk slices with a small performance change between storage disks at different tiers, they may be allocated to storage disks at low tiers, while for disk slices with a large performance change between storage disks at different tiers and with a high access frequency, they may be allocated to storage disks at high tiers in order to improve storage efficiency.

Figure 5:
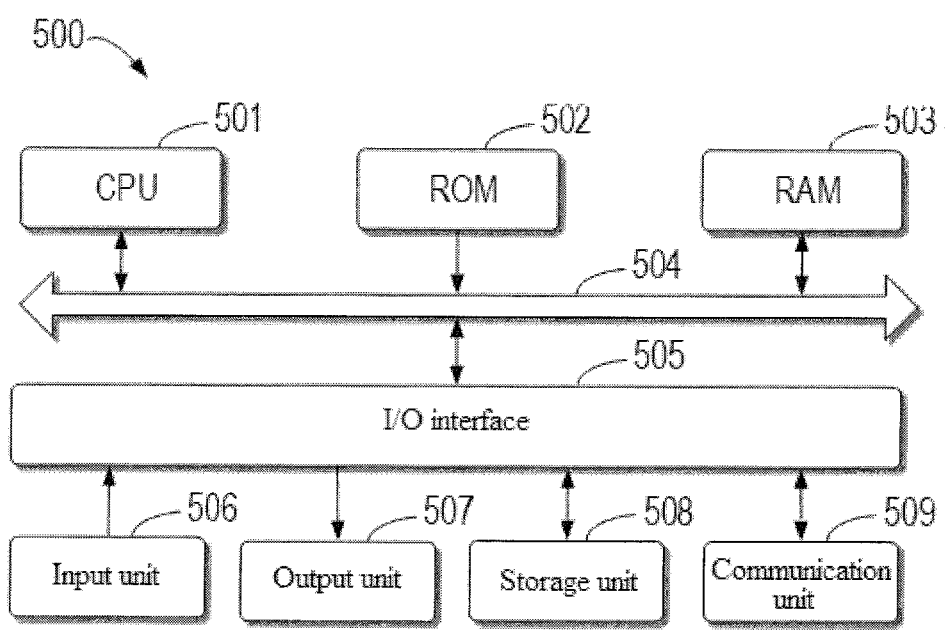
FIG. 5 shows a schematic block diagram of an example device suitable for implementing embodiments of the present disclosure.

FIG. 5 shows a schematic block diagram of example device 500 suitable for use to implement embodiments of the present disclosure. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, for example, processes 200 and/or 300, may be performed by processing unit 501. For example, in some embodiments, processes 200 and/or 300 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded into RAM 503 and executed by CPU 501, one or more actions of processes 200 and/or 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for moving a disk slice to a position in a plurality of disks, the plurality of disks having a plurality of positions, the method comprising:
   determining, based on differences in performance parameters of an access pattern of the disk slice on the plurality of disks, performance information of the access pattern of the disk slice;
   determining a score for the disk slice based on the performance information and access frequency information of the disk slice, the plurality of positions being associated with a corresponding plurality of score ranges; and
   determining, from among the plurality of positions, a position of the disk slice in the plurality of disks based on the score;
   wherein determining, from among the plurality of positions, the position of the disk slice in the plurality of disks includes moving the disk slice to the position of the disk slice in the plurality of disks; and
   wherein the plurality of disks is in a plurality of storage tiers.

2. The method according to claim 1, wherein determining, based on the differences in the performance parameters of the access pattern of the disk slice on the plurality of disks, the performance information of the access pattern of the disk slice comprises:
   acquiring a corresponding plurality of performances of the access pattern on the plurality of disks;
   determining, based on the corresponding plurality of performances of the access pattern on the plurality of disks, a corresponding plurality of comprehensive performance parameters of the access pattern on the plurality of disks; and
   determining the performance information based on differences in the corresponding plurality of comprehensive performance parameters of the access pattern between the plurality of disks.

3. The method according to claim 2, wherein the corresponding plurality of performances of the access pattern on the plurality of disks comprise at least one of the following performance parameters:
   bandwidth;
   Input/Output Operations Per Second; and
   response time.

4. The method according to claim 2, wherein the corresponding plurality of performances of the access pattern on the plurality of disks are normalized performance data.

5. The method according to claim 2, wherein determining the performance information based on the differences in the comprehensive performance parameters comprises:
   determining a standard deviation of the comprehensive performance parameters of the access pattern between the plurality of disks as the performance information.

6. The method according to claim 1, wherein determining the position of the disk slice in the plurality of disks comprises:
   moving the disk slice to a position having a first priority in the plurality of disks if determining that the score is higher than or equal to a threshold score; and
   moving the disk slice to a position having a second priority in the plurality of disks if determining that the score is lower than the threshold score,
   wherein the first priority is higher than the second priority.

7. An electronic device, comprising:
   a processor; and
   a memory coupled to the processor and having instructions stored therein which, when executed by the processor, cause the electronic device to perform actions for moving a disk slice to a position in a plurality of disks, the plurality of disks having a plurality of positions, the actions comprising:
   determining, based on differences in performance parameters of an access pattern of the disk slice on the plurality of disks, performance information of the access pattern of the disk slice;
   determining a score for the disk slice based on the performance information and access frequency information of the disk slice, the plurality of positions being associated with a corresponding plurality of score ranges; and
   determining, from among the plurality of positions, a position of the disk slice in the plurality of disks based on the score;
   wherein determining, from among the plurality of positions, the position of the disk slice in the plurality of disks includes moving the disk slice to the position of the disk slice in the plurality of disks; and
   wherein the plurality of disks is in a plurality of storage tiers.

8. The electronic device according to claim 7, wherein determining, based on the differences in the performance parameters of the access pattern of the disk slice on the plurality of disks, the performance information of the access pattern of the disk slice comprises:
   acquiring a corresponding plurality of performances of the access pattern on the plurality of disks;
   determining, based on the corresponding plurality of performances of the access pattern on the plurality of disks, a corresponding plurality of comprehensive performance parameters of the access pattern on the plurality of disks; and determining the performance information based on differences in the corresponding plurality of comprehensive performance parameters of the access pattern between the plurality of disks.

9. The electronic device according to claim 8, wherein the corresponding plurality of performances of the access pattern on the plurality of disks comprise at least one of the following performance parameters:

bandwidth;

Input/Output Operations Per Second; and response time.

10. The electronic device according to claim 8, wherein the corresponding plurality of performances of the access pattern on the plurality of disks are normalized performance data.

11. The electronic device according to claim 8, wherein determining the performance information based on the differences in the comprehensive performance parameters comprises:

determining a standard deviation of the comprehensive performance parameters of the access pattern between the plurality of disks as the performance information.

12. The electronic device according to claim 7, wherein determining the position of the disk slice in the plurality of disks comprises:

moving the disk slice to a position having a first priority in the plurality of disks if determining that the score is higher than or equal to a threshold score; and moving the disk slice to a position having a second priority in the plurality of disks if determining that the score is lower than the threshold score, wherein the first priority is higher than the second priority.

13. A computer program product having a non-transitory computer readable medium which stores a set of instructions to manage disks; the set of instructions, when carried out by computerized circuitry, causing the computerized circuitry to perform a method for moving a disk slice to a position in a plurality of disks, the plurality of disks having a plurality of positions, the method comprising:

determining, based on differences in performance parameters of an access pattern of the disk slice on the plurality of disks, performance information of the access pattern of the disk slice;

determining a score for the disk slice based on the performance information and access frequency information of the disk slice, the plurality of positions being associated with a corresponding plurality of score ranges; and determining, from among the plurality of positions, a position of the disk slice in the plurality of disks based on the score;

wherein determining, from among the plurality of positions, the position of the disk slice in the plurality of disks includes moving the disk slice to the position of the disk slice in the plurality of disks; and wherein the plurality of disks is in a plurality of storage tiers.

\* \* \* \* \*